United States Patent [19]
Olson et al.

[11] Patent Number: 5,790,444
[45] Date of Patent: Aug. 4, 1998

[54] FAST ALIGNMENT UNIT FOR MULTIPLY-ADD FLOATING POINT UNIT

[75] Inventors: Christopher Hans Olson; Martin Stanley Schmookler, both of Austin, Tex.

[73] Assignee: International Business Machines Corporation, Armonk, N.Y.

[21] Appl. No.: 727,331

[22] Filed: Oct. 8, 1996

[51] Int. Cl.$^6$ .................... G06F 7/00; G06F 7/38
[52] U.S. Cl. ............... 364/748.07; 364/715.04; 364/715.08
[58] Field of Search .............. 364/715.04, 715.08, 364/736.02, 748.07, 750.5, 754.01, 757, 759, 760.01–760.05

[56] References Cited

U.S. PATENT DOCUMENTS

| | | | |
|---|---|---|---|
| 3,810,115 | 5/1974 | Stafford | 340/172.5 |
| 4,841,467 | 6/1989 | Ho et al. | 364/748 |
| 4,852,037 | 7/1989 | Aoki | 364/736 |
| 4,916,651 | 4/1990 | Gill et al. | 364/736 |
| 4,969,118 | 11/1990 | Montoye et al. | 364/748 |
| 4,999,802 | 3/1991 | Cocanougher et al. | 364/742 |
| 5,130,940 | 7/1992 | Omote | 364/715.08 |
| 5,241,493 | 8/1993 | Cha et al. | 364/748 |
| 5,375,078 | 12/1994 | Hrusecky et al. | 364/736 |
| 5,517,438 | 5/1996 | Dao-Trong et al. | 364/748 |

*Primary Examiner*—Chuong Dinh Ngo
*Attorney, Agent, or Firm*—Morgan & Finnegan, LLP; Joseph C. Redmond, Jr.; Anthony V. S. England

[57] ABSTRACT

A floating point arithmetic unit performs a multiply-add function B+(A*C) in which an alignment shifter is responsive to an input signal representative of the B mantissa. The shifter includes a sequential stack of multiplexers, typically three (3), for shifting the B mantissa to align it with the A*C product, and a complementer contained between two of the multiplexers to invert the signals when B is a negative number. A shift amount generator responsive to the A, B and C exponents produces control signals for the multiplexers. The shift amount generator includes a multiple input adder utilizing carry save adder and carry lookahead adder techniques to minimize delay, and separate decoders for each multiplexer or group of multiplexers. The generator also includes a Leading Zeros Anticipator (LZA) circuit for the most significant bits to limit shift amount signals that are within the shifting range of the shifter, which reduces the delay attributed to the carry lookahead adder. The multiplexers are arranged in a sequence such that the control signals for the first multiplexers are dependent only on the least significant bits and thus can be generated earliest, and therefore the delay of these multiplexers and the delay of the complementer is in parallel with the delay for producing the control signals to the last multiplexers.

10 Claims, 3 Drawing Sheets

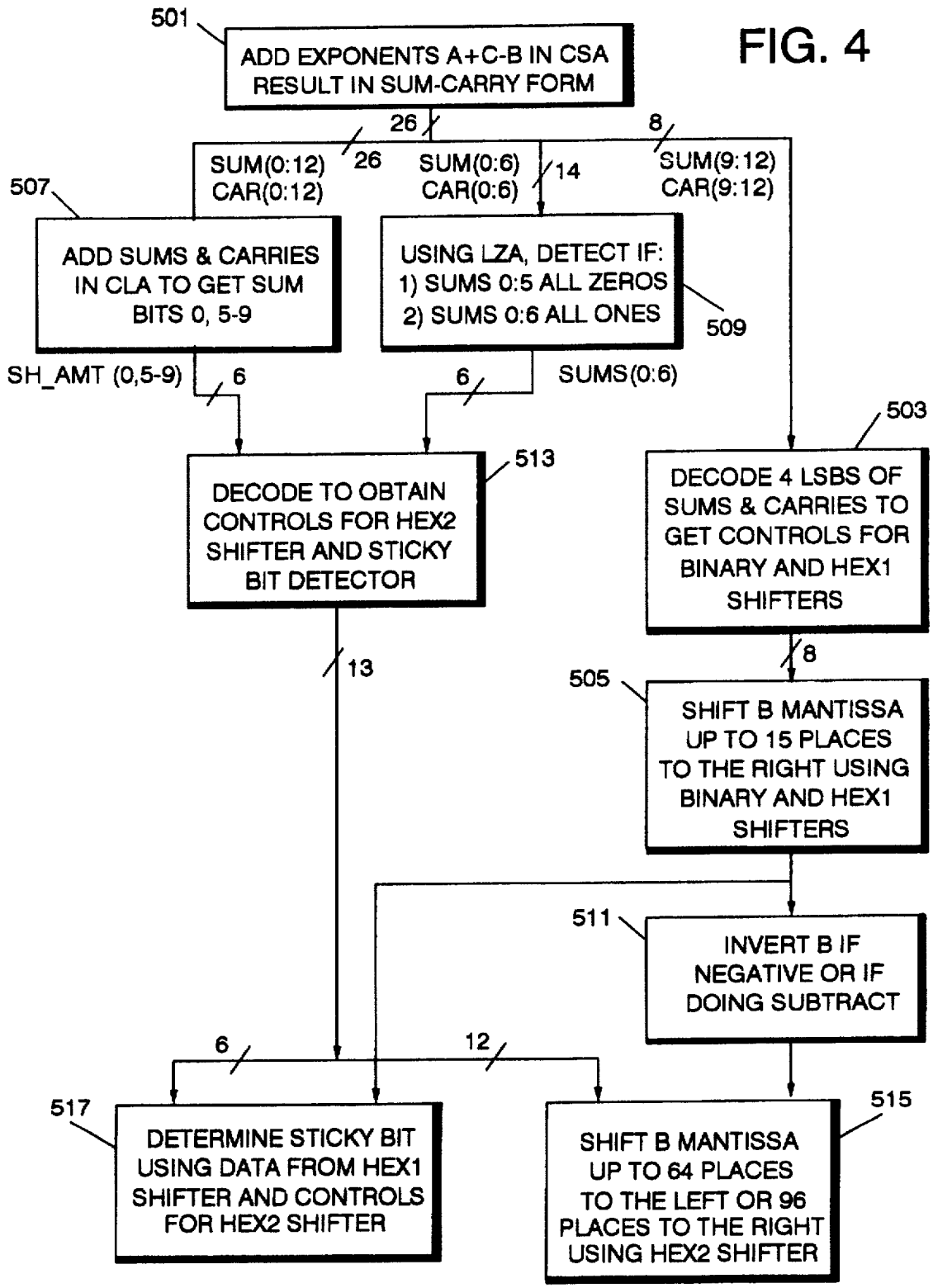

FAST ALIGNMENT UNIT FOR MULTIPLY-ADD FLOATING POINT UNIT

BACKGROUND OF INVENTION

1. Field of Invention

This invention relates to data processing systems and more particularly to an improved apparatus and method for providing floating point arithmetic operations.

2. Description of the Prior Art

The classical floating point arithmetic operation to which the invention is directed involves, in succession, the multiplication of two operands followed by the addition of the resultant with a third operand, mathematically described as B+(A*C). A data processing operation which performs multiply-add function B+(A*C) requires that the B operand be properly aligned with the product of A*C before they are added. This alignment requires shifting the B operand relative to the A*C product where the shifted amount is based on the exponents of A, B and C. In many implementations, the output for the alignment is later than the A*C resultant from the multiplier. The time for performing the multiply-add operation could be decreased if the delay for performing the alignment is decreased.

The prior art related to the alignment problem addressed by the present invention is as follows:

U.S. Pat. No. 4,841,467 issued Jun. 20, 1989, discloses a pipe line architecture to accomplish floating point operations such as addition or subtraction in a single cycle and to accomplish multiply/accumulate operations in two cycles. Alignment of the multiply and addition parts is performed solely in a right shifter which responds to an exponent comparator indicating which fractional part of an operand is to be right shifted in the shifter.

U.S. Pat. No. 4,852,037 issued Jul. 25, 1989, discloses an arithmetic unit for both multiplication and addition which is capable of calculating a sum in a time interval for only a multiplication process of calculating the product. '037 discloses the use of a controlled shifter for a multiplyadd operation for non-floating point arithmetic.

U.S. Pat. No. 4,916,651 issued Apr. 10, 1990, discloses a floating point processor having simultaneous multiplication and addition in separate pipeline channels. Multiplexors are provided at the inputs to the multiplier and an arithmetic logic unit which permit a product of sums calculation and a sum of products calculation to be performed without addressing the alignment problem.

U.S. Pat. No. 4,969,118 issued Nov. 6, 1990, discloses floating point apparatus for performing the multiply-add function which uses a shifter providing a shifted first mantissa output to a complementer before combining with a second multiplied mantissa in an adder, the complementer adding to the delay in aligning the first and second mantissas.

U.S. Pat. No. 4,999,802 issued Mar. 12, 1991, discloses a floating point arithmetic unit that performs a multiply and addition operation in a pipeline. Control circuitry performs the addition of exponents for a multiplication operation in a multiplier. The addition information is used by an aligner to properly align the addition operand with the multiplier resultant.

U.S. Pat. No. 5,241,493 issued Aug. 31, 1993, discloses a reduced cost floating point arithmetic unit which performs a multiplication-add function. During the first clock cycle, an alignment shifter provides the low-order part of an aligned addition operand, which is added to the partial products from the first iteration of the multiplier. During the second clock cycle, the alignment shifter provides the high order part of the addition operand, which is added to the partial products from the second iteration of the multiplier.

U.S. Pat. No. 5,375,078 issued Dec. 20, 1994 discloses a floating point arithmetic unit including an aligning unit for aligning the inputs to an adder to equalize the power of each input. The aligners comprise shifting circuits which shift the input right in 4 bit increments. Multiplexers select which inputs are supplied to the adder.

U.S. Pat. No. 5,517,438 issued May 14, 1996, having a priority date of Sept. 29, 1993, discloses a pipe line floating point processor in which multiplexers and shifters perform alignment prior to addition.

None of the prior art disclose a multiply-add floating point unit which aligns the addition operand with a resultant of a multiplication operation before the multiplication operation is completed and in which the delay of a complementer is included in the aligner and not after the alignment operation.

SUMMARY OF THE INVENTION

An object of the invention is an improved floating point unit and method of operation which reduces the delay in performing a multiply-add operation.

Another object is a floating point arithmetic unit and method of operation for a multiply-add function in which an aligner including multiple shifters responds to control signals generated by a shift amount generator.

Another object is a floating point arithmetic unit and method of operation in which a shift amount generator calculates and provides discrete shift amounts as control signals for multiple shifters in performing an alignment of an addition operand with respect to a multiplication product.

Another object is a floating point arithmetic unit and method of operation in which any delay for a complementing operation occurs within the shifting delay.

Another object is a floating point arithmetic unit and method of operation in which the reference point for shifting is changed resulting in left and right shifting and reduced delay in the shifting controls.

Another object is a floating arithmetic unit and method of operation in which a shift amount generator includes logical 1/0's detect circuits to reduce the number of stages and accompanying delay in a carry look ahead adder.

These and other objects, features, and advantages are achieved in a floating arithmetic unit which performs a multiply-add function B+(A*C) where B, A, and C are numeric values expressed in the form of a mantissa, radix and exponent. An alignment shifter responsive to an input signal representative of a mantissa for the B numeric value includes a plurality of multiplexers, typically three (3), each multiplexer responsive to a control signal for shifting the B mantissa signal a discrete amount according to the control signal supplied to the multiplexer for aligning the B mantissa with the resultant of the A*C multiplication. A shift amount generator including a multiple input adder with carry save and carry look ahead functions is responsive to signals representative of the A and C exponents and the complement of the B exponent to produce signals representative of the A and C exponents less the B exponent. The high order bits of the carry look ahead adder are replaced with leading zero/one anticipator (LZA) circuits to reduce the delay accompanying the carry look ahead adder. A first decoder responsive to the sum and carry signals from the carry save function generates shift selects as the control signals for the first and second multiplexers in which the two least significant bits of the sum and carry signals are decoded to provide control signals for binary alignment as input to a first multiplexer to right shift the B mantissa in a range of 0, 1, 2, or 3 bit positions. The first decoder also decodes the four least significant digits of the sum and carry signals to provide the Hex1 control signals as input to the second multiplexer which receives the output of the first multiplexer to right shift the B mantissa in multiples of 0, 4, 8 and 12 bit positions. A second decoder responsive to the output signals from the carry lookahead adder and LZA produces a Hex2 control signal to the third multiplexer which receives the output from the second multiplexer and shifts the B mantissa either left or right in multiples of 16 bits in the range of −64, −48, −32, −16, 0, 16, 32, 48, 64, 80, 96 for a total of 160 bit positions. A complementer is included between the second and third multiplexers to invert the Hex1 signal for when B is a negative number whereby any complementer delay occurs within the generation of control signals for the third multiplexer, and does not add to the total delay for the aligner. The Hex2 control signal together with the output from the second multiplexer (Hex1 signal) determines the presence of a "sticky bit" for rounding the B mantissa to a desired precision.

In operation, the aligner adds the exponents of A+C−B, each expressed in 13 bit positions, in the carry save adder and the results appear in sum+carry form, each expressed in 13 bit positions. The four least significant bits (9:12) of the sum and carry results are provided to the first decoder to generate the binary alignment and Hex1 control signals to right shift the B mantissa in the first and second multiplexers 0, 1, 2 & 3 bit positions and 0, 4, 8, and 12 bit positions, respectively, shifting the B mantissa up to 15 places to the right. The sum and carry results (0:12) are also provided as inputs to the carry lookahead adder to obtain sum bits (0, 5:9) as an input to the second decoder to generate the Hex2 control signals for the third multiplexer. The sum and carry results (0:6) are also provided as inputs to the leading 1/0 detector (LZA) circuits to determine if either sums (0:5) are all zeros (for a positive sum) or sums (0:6) are all ones (for a negative sum). The LZA output is provided as a second input to the second decoder. The second decoder provides the Hex2 control signal to the third multiplexer which shifts the B mantissa up to 64 bit positions to the left or 96 bit positions to the right. When the B mantissa is negative, the Hex1 inputs from the second multiplexer to the third multiplexer are inverted for addition purposes, using an alignment invert control signal to the complementer circuit. The Hex2 control and the Hex1 multiplexer signals are also provided to another logical circuit. This circuit determines the presence of a "sticky bit" for rounding the mantissa of the result to the desired precision, as specified by IEEE Standard #754 for Binary Floating-Point Arithmetic. The "sticky bit" is the logical OR of all bits shifted to the right of the least significant bit position of the product A*C.

DESCRIPTION OF THE DRAWINGS

FIG. 4 is a flow diagram describing the operation of the alignment shifter of FIG. 2 and the shift amount generator of FIG. 3 in performing the method of the present invention.

DETAILED DESCRIPTION OF A PREFERRED EMBODIMENT

A prior art floating point unit for calculating the function B+(A*C) is described in U.S. Pat. No. 4,999,802 issued Mar. 12, 1991, and assigned to the assignee of the present invention. The floating point unit described in the '802 patent includes a shifter which operates in a manner of an ordinary shifter to shift the mantissa of the operand B to the right by an amount determined from the calculation Exponent (A)+Exponent (C)−Exponent (B). The calculated amount is applied to the input of the shifter which in turn controls the amount the input B mantissa is shifted to the left or right of the binary point. Shifters of the type shown in the '802 patent have been included in previous processors such as the IBM RISC/6000 and PowerPC 604. However, such processors retain the most significant bit as the reference point for the shift which complicates the shift controls and adds to the delay of the shifter. The present invention simplifies the shift controls and reduces the delay through the following improvements:

1. The reference point for the shift is moved by 56 bit positions resulting in a shifter with left and right shifts which facilitates the generation of the shift control signals.
2. The use of leading 0/1 (LZA) detect circuits in place of the high order bits of a carry look ahead adder reduces total shift delay.
3. A complementer included within the shifter is a part of the shifter delay and does not add a separate additional delay to the shifter delay as in prior art processors.

Accordingly, the present invention describes an alignment unit which combines several techniques for reducing the total delay in aligning an addition operand in a multiply-add function. The alignment unit is part of the floating point unit in a processor system, e.g. the PowerPC 601 which interacts with a memory to store/retrieve, inter alia, the A, B and C numeric values in floating point form and execute stored program instructions in the memory to perform the method of the present invention.

Figure 1:
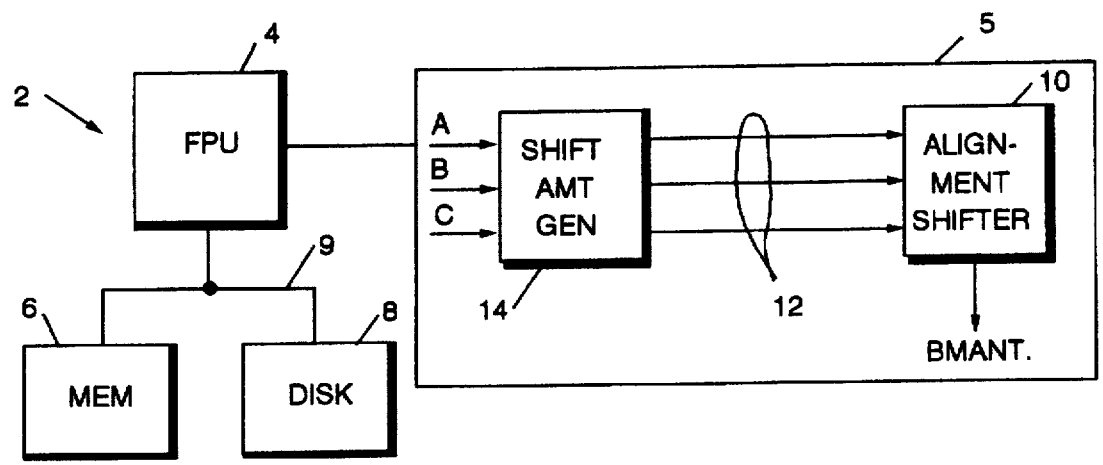
FIG. 1 is a block diagram of a floating point unit including an alignment unit which incorporates the principles of the present invention.

In FIG. 1 a block diagram is shown for a portion of a processor system 2, such as the PowerPC 601. A Floating Point Unit 4 in the processor system includes an alignment unit 5 and is coupled to a system memory 6 and a disk drive 8 through a storage unit and system bus 9. The disk drive contains stored program instructions in floppy or mini disks (not shown) for loading the memory 6 in operating the processor system. An alignment shifter 10 within the alignment unit 5 receives as an input the mantissa of B from the memory 6. Also provided to the shifter 10 are a series of control signals 12 for shifting the B mantissa a necessary amount for alignment with the product resulting from the multiplication of the operands A and C in a multiplier (not shown). The control signals are provided by a shift amount generator 14 within the alignment unit 5, the generator responding to signals representative of the A exponent, B exponent and C exponent received from a register (not shown) for numerics A, B, C expressed in floating point form.

Figure 2:
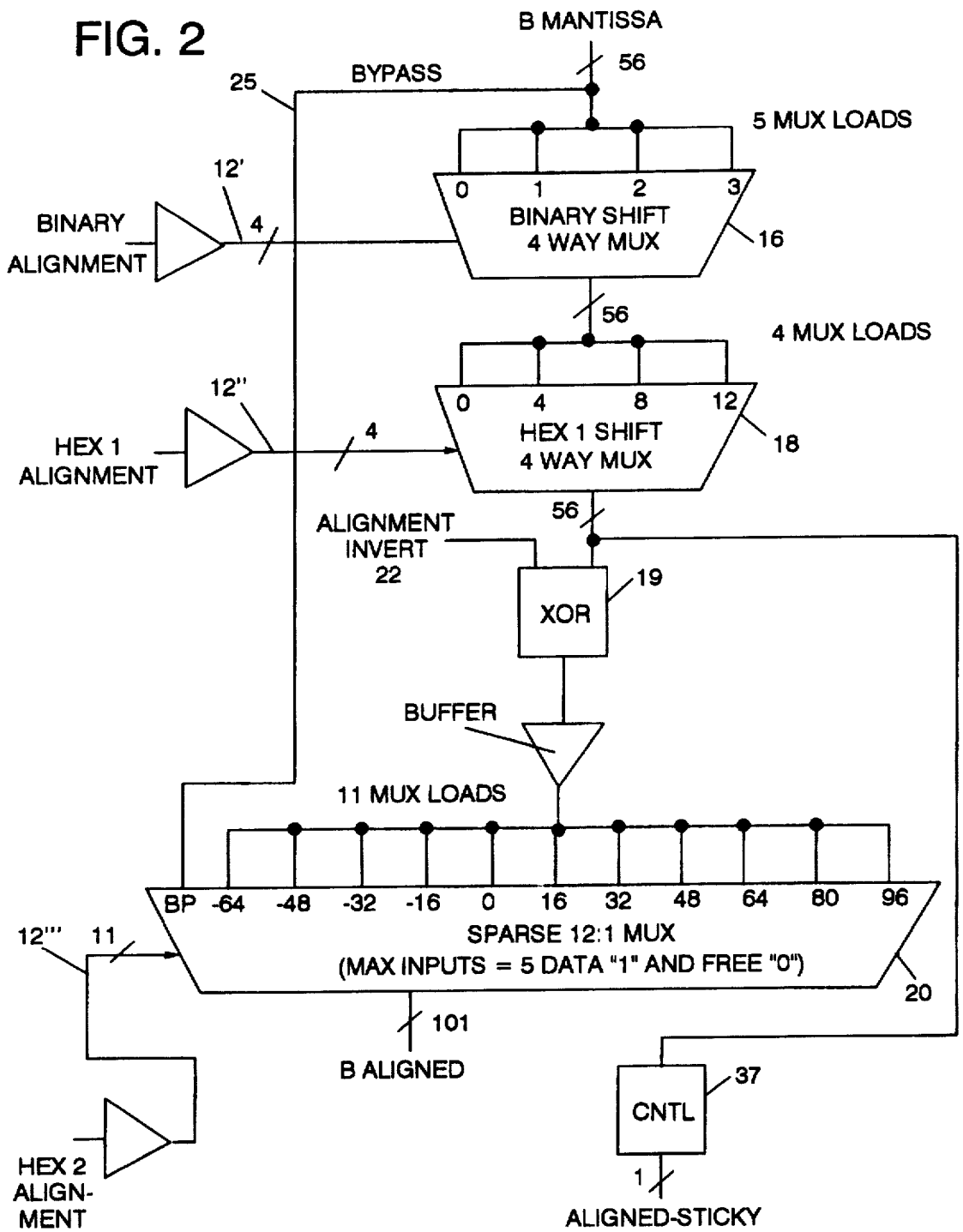
FIG. 2 is a block diagram of an alignment shifter in the floating point arithmetic unit of FIG. 1.

In FIG. 2 the alignment shifter 10 is shown in more detail. Included in the alignment shifter 10 are a first four-way multiplexer 16, a second four-way multiplexer 18 and a twelve-way multiplexer 20. It should be understood that the alignment shifter of the present invention is not limited to the number of multiplexers or the size of the multiplexers, as shown, but may be of a different number of multiplexers of different sizes according to the desired delay and simplicity of operation of the alignment unit.

The multiplexer 16 receives as an input a B mantissa expressed in 53 bit positions. The B mantissa is supplied from a register file or other suitable unit of the floating point unit. The B mantissa may be shifted 0, 1, 2, or 3 positions to the right in response to the control signal 12' as a binary alignment of the B mantissa. The output of the multiplexer 16, which now may be as much as 56 bit positions, is provided as an input to the second multiplexer 18 which is adapted to shift the B mantissa, 0, 4, 8, or 12 positions according to a second control signal 12" as a Hex1 alignment. The output of the multiplexer 18 which now may be as much as 68 bit positions and right shifted up to 15 bit positions is provided to (1) a set of exclusive or circuits 19 to perform a ones complement operation in response to an alignment invert signal 22 when the B operand is a negative number, and (2) to a logic circuit 37 for determining the presence of a "sticky bit" used in rounding the final result of the multiply-add operation to a desired precision.

The exclusive OR circuits 19, in the absence of an alignment invert signal, provide the 68 bit positions of the partially shifted B mantissa as an input to the multiplexer 20. In response to an 11 bit control signal 12'" referred to as the Hex2 alignment control, the multiplexer is adapted to shift the B mantissa left or right in multiples of 16 bits. One input of the multiplexer 20 is reserved for a by-pass path 25 for receiving an unshifted B mantissa when the control signals 12', 12" and 12'" indicate a shift count of more than 56 bit positions to the left which is the case when the operand B is much greater than the product of the operands A*C indicating that the operands do not overlap. When the bypass path is selected, the B mantissa appears as if it were shifted left 56 bit positions. The multiplexer 20 provides an aligned B mantissa in as many as 161 bit positions when B is a negative number. The shifted B is expressed in a one's complement form with 1's filling in on both sides of the shifted B.

Figure 3:
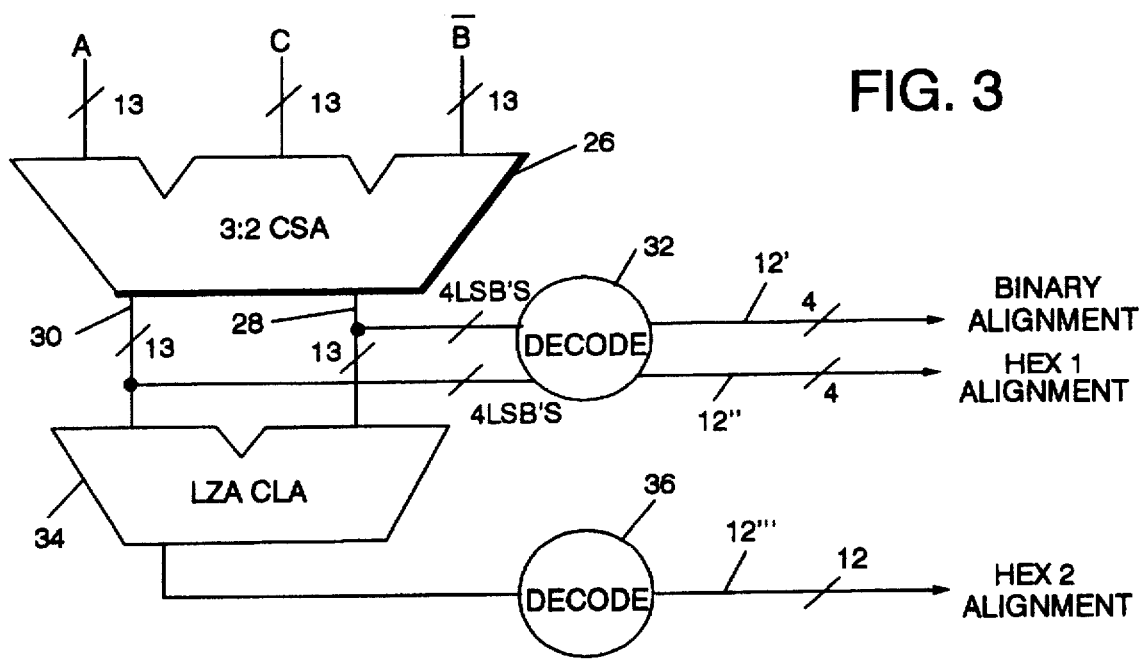
FIG. 3 is a block diagram of a shift amount generator in the floating point arithmetic unit of FIG. 1.

Turning to FIG. 3, the shift amount generator includes a 3:2 carry save adder (CSA) 26 for receiving the A exponent, C exponent and inverted B exponent inputs of the operands for a multiply-add operation. Each exponent is expressed in 13 bit positions. Carry save adders are well known in the art and described in the cited '802 patent, for example. The purpose of the adder 26 is to determine the shift count (SC) for aligning the B operand with the product of the A & C operands in an addition operation. The shift count is calculated from the following relation (1) and provided as a sum signal 28 and a carry signal 30 from the adder 26:

(1) SC=EXP(A)+EXP(C)−EXP(B)+K

Where $K=-2^{12}+1$ ( the terms $2^{12}$ and+1 being a bias prescribed in the IEEE Standard 754, adjusted for use with 13 bit exponents).

The shift count SC may be negative, corresponding to a left shift of B with respect to the product of A and C, or it may be positive, corresponding to a right shift.

The outputs 28 and 30 are provided as inputs to a first decode circuit 32 which selects the four least significant bits of the sum and carry signals as control signals 12' and 12" which provide the binary alignment and Hex1 alignment input signals to the multiplexers 16 and 18, respectively. The multiplexer 16 uses the two least significant bits of the shift count to shift the B mantissa 0, 1, 2 or 3 positions to the right. The multiplexer 18 uses the next two least significant bits of the shift count to shift the B mantissa 0, 4, 8, 12 to the right.

The outputs 28 and 30 are also provided to a carry look ahead adder (CLA) 34 which is used to speed up binary additions by eliminating the carry propagation delay. Carry look ahead adders are well known in the art and described, for example, in the text "Digital Logic: Analysis, Application and Design" by S. Garrod and R. J. Borns, published by Saunders College Publishing, a Division of Holt, Reinhart & Winston, Inc., Philadelphia, Pa., 1991, pages 346–348 (ISBN: 0-03-023099-3). To further speed up the output of the adder 34, the high order adder stages are replaced with leading 0/1 anticipator (LZA) circuits which are used to detect cases where either the high order 6 bits are all zeroes or the high order 7 bits are all ones. LZA circuits are well known in the art and described, for example, in U.S. Pat. No. 5,493,520 issued Feb. 20, 1996, in FIG. 3 thereof. The LZA adder 34 provides the two LZA signals and sum bits 0, 5:9 to a second decoder 36 which provides a control signal 12'" expressed in 12 bit positions as a Hex2 alignment signal for controlling the multiplexer 20. Only one of the 12 bit positions may be activated at any time. The Hex2 control signal shifts the B mantissa either left or right −64, −48, −32, −16, 0, 16, 32, 48, 64, 80, 96, or selects a bypass path. Five bit positions of the Hex2 control signal are provided as a first input to the control circuit 37 which in combination with the output signals from multiplexer 18 of FIG. 2 determines the presence of the "sticky bit". This occurs when the B mantissa is much smaller than the product of A*C in which case some of the B bits would be to the right of the A*C product and not significant in the final result. The "sticky bit" is the OR of all bits to the right of the least significant bit of the A*C product and used for rounding the final result to the desired precision. The decoder 36 also provides an additional signal to the circuit 37 which indicates that the shift count SC is 112 or greater. When this signal is active, none of the 12 bit positions of the Hex2 control signal should be active.

The operation of the alignment shifter and shift amount generator will now be described in conjunction with FIG. 4.

In a step 501, the exponents of the operands A+C−B are added in the carry save adder 26 and the result provided in the sum carry form.

In a step 503, the sum and carry bits 9:12, the least significant bits of the sum and carry bits, are decoded in the decoder 32 and provided as binary alignment and Hex1 controls for the multiplexers 16 and 18, respectively.

In an operation 505 the B mantissa is shifted up to 15 places to the right using the binary and Hex1 shifters exercising the binary alignment and Hex1 controls appearing on lines 12' and 12", respectively.

In a step 507 the sum bits 0:12 and the carry bits 0:12 are provided to the carry look ahead adder 34 to obtain sum bits 0 and 5:9 which are used to obtain the Hex2 shift control signals. Simultaneously, in a step 509, the LZA in the carry look adder 34 detects if sum bits 0:5 are all zeroes or sum bits 0:6 are all ones. In so doing, the LZA eliminates the need for producing the high order bits of the shift count explicitly and then decoding them.

In a step 511, the Hex1 data is inverted if an alignment invert signal 22 is provided to the exclusive OR 20 when the B mantissa is a negative number or a subtraction operation is to be performed.

In a step 513, the sum bits 0, and 5:9 are provided to the decoder 36 which generates the Hex2 shifter control signals provided to the multiplexer 20 in a step 515 which shifts the B mantissa up to 64 places to the left or 96 places to the right using the Hex2 control signals. In the event the operand B is a negative number or subtraction was being performed, the inverted data is provided to the Hex2multiplexer. The Hex1 data and five of the Hex2 control signals are provided to the control circuit 37 for determining the presence of a Sticky Bit in a step 517 which is used in rounding the final result to the desired position.

While the invention has been described in conjunction with a specific embodiment, it is apparent that various modifications can be made therein without departing from the spirit and scope of the invention as defined in the appended claims, in which

I claim:

1. In an apparatus for performing a floating point arithmetic operation B+(A*C) where B, A, and C are numeric values expressed in the form of a mantissa, radix and exponent, an aligner comprising:

(a) an alignment shifter responsive to an input signal representative of the mantissa for the B numeric value, the shifter including a plurality of multiplexers (m1, m2, ... mN) coupled together in a stacked relation, each multiplexer responsive to a control signal for shifting the B mantissa signal a discrete amount according to the control signal supplied to the multiplexer;

(b) a shift amount generator including a multiple input carry save adder responsive to signals representative of the A and C exponents and the complement of the B exponent to produce as an output a shift amount for aligning the B mantissa with an A* C resultant;

(c) a first decoder responsive to a first portion of the shift amount to produce a binary alignment control signal as an input to a first multiplexer for a first right shift amount;

(d) the first decoder responsive to a second portion of the shift amount to produce a hex1 control signal as an input to a second multiplexer for a second right shift amount;

(e) a complementer coupled between two of the multiplexers in the plurality of multiplexers and responsive to an input signal for inverting the input signal when B is a negative value; and (f) a second decoder responsive to a third portion of the shift amount to produce a hex2 control signal as an input to the third multiplexer for a left or right shift amount whereby the alignment of the B mantissa precedes the A*C resultant.

2. The apparatus of claim 1 wherein the carry save adder calculates a Shift Count (SC) from the relation:

SC=EXP(A)+EXP(C)−EXP(B)+K

Where $K=-2^{12}+1$ (the terms $2^{12}$ and +1 being a bias prescribed in the IEEE Standard 754, adjusted for use with 13 bit exponents).

3. The apparatus of claim 1 further including a carry look ahead adder coupled between the carry save adder and the second decoder, the carry look ahead adder including Logical Zero Anticipator circuits in lieu of adder cells in the high order stages.

4. The apparatus of claim 1 wherein the first multiplexer in the plurality of multiplexers receives the B mantissa and is responsive to the binary alignment control signal to shift the mantissa 0, 1, 2, or 3 positions to the right.

5. The apparatus of claim 1 wherein the second multiplexer responsive to the Hex1 alignment control signal receives an input from the first multiplexer to shift the mantissa 0, 4, 8 or 12 positions to the right.

6. The apparatus of claim 1 wherein the complementer is a plurality of Exclusive OR circuits for coupling the output of one multiplexer to the input of the next multiplexer in the absence of an inverting signal.

7. The apparatus of claim 1 wherein the third multiplexer is responsive to the Hex2 alignment control signal and the output of the complementer to shift the mantissa left or right in multiples of 16 bits.

8. The apparatus of claim 1 further including a bypass path for providing the B mantissa input signal to the third multiplexer when the shift amount indicates the B value is much greater than the A*C value.

9. In an apparatus for performing a floating point arithmetic operation B+(A*C) where B, A, and C are numeric values expressed in the form of a binary point, mantissa, radix and exponent, a method for reducing the delay in aligning the mantissas of the B numeric value and the product of the A and C values, comprising the steps of:

a) providing the B mantissa as an input to an alignment shifter;

b) providing the A and C exponents and the complement of the B exponent to a shift amount generator;

c) generating in the shift amount generator a shift amount for aligning the B mantissa with a resultant of an A*C mantissa multiplication;

d) generating in a first decoder from a first portion of the shift amount a binary alignment control signal as an input to a first multiplexer for a first right shift amount;

(e) generating in the first decoder responsive to a second portion of the shift amount a hex1 control signal as an input to a second multiplexer for a second right shift amount;

(f) providing to a complementer coupled between the second and a third multiplexer an input signal for inverting the output of the second multiplexer when the B mantissa is a negative value; and (g) generating in a second decoder responsive to a third portion of the shift amount a hex2 control signal as an input to the third multiplexer for a left or right shift amount whereby the alignment of the B mantissa precedes the A*C resultant.

10. An article of manufacturing comprising:

(a) a computer usable medium having computer readable program code means embodied therein for aligning numeric values A, C and B, expressed in floating point arithmetic, for performing a multiply-add operation B+(A*C) in a computer system, the computer readable program code means in said article of manufacturing comprising:

(a1) computer readable program code means providing the B mantissa as an input to an alignment shifter;

(a2) computer readable program code means providing the A and C exponents and the complement of the B exponent to a shift amount generator;

(a3) computer readable program code means generating in the shift amount generator a shift amount for aligning the B mantissa with a resultant of an A*C mantissa multiplication;

(a4) computer readable program code means generating in a first decoder from a first portion of the shift amount a binary alignment control signal as an input to a first multiplexer for a first right shift amount;

(a5) computer readable program code means generating in the first decoder responsive to a second portion of the shift amount a hex1 control signal as an input to a second multiplexer for a second right shift amount;

(a6) computer readable program code means providing to a complementer coupled between the second and a third multiplexer an input signal for inverting the output of the second multiplexer when the B mantissa is a negative value; and (a7) computer readable program code means generating in a second decoder responsive to a third portion of the shift amount a hex2 control signal as an input to the third multiplexer for a left or right shift amount whereby the alignment of the B mantissa precedes the A*C resultant.

* * * * *